(12) United States Patent
Graham (10) Patent No.: US 7,637,087 B1
(45) Date of Patent: Dec. 29, 2009

(54) BODY BLANKET FOR HOOFED AND DOMESTICATED ANIMALS

(76) Inventor: Lenore Graham, 7615 Dogwood Trail, Murrayville, GA (US) 30564

( * ) Notice: Subject to any disclaimer, the term of this patent is extended or adjusted under 35 U.S.C. 154(b) by 428 days.

(21) Appl. No.: 11/442,559

(22) Filed: May 27, 2006

(51) Int. Cl.
*B68C 5/00* (2006.01)
(52) U.S. Cl. ................................. 54/79.2; 54/79.1
(58) Field of Classification Search ............. 54/79.1, 54/79.2, 79.3, 79.4; 119/850
See application file for complete search history.

(56) References Cited

U.S. PATENT DOCUMENTS

| | | | | |
|---|---|---|---|---|
| 134,921 | A | * | 1/1873 | Morris ........................ 54/79.1 |
| 233,275 | A | * | 10/1880 | Osborn ........................ 54/79.2 |
| 1,028,138 | A | | 6/1912 | Schleicher |
| 1,612,945 | A | | 1/1927 | Rieck |
| 2,131,495 | A | * | 9/1938 | Allen ........................ 54/79.2 |
| 4,214,421 | A | | 7/1980 | Battle et al. |
| 4,355,600 | A | | 10/1982 | Zielinski |
| 4,671,049 | A | | 6/1987 | Benckhuijsen |
| 4,955,182 | A | | 9/1990 | Newman |
| 5,125,220 | A | | 6/1992 | Martin |
| 5,161,352 | A | | 11/1992 | Schneider et al. |
| 5,271,211 | A | | 12/1993 | Newman |
| 6,058,890 | A | * | 5/2000 | Harrell ........................ 119/850 |
| 6,408,604 | B1 | | 6/2002 | Schneider |
| 6,431,123 | B1 | * | 8/2002 | Hibbert ........................ 119/850 |
| 6,467,244 | B1 | | 10/2002 | Kelley et al. |
| 6,539,898 | B2 | * | 4/2003 | Gatto ........................ 119/850 |
| 6,877,300 | B1 | | 4/2005 | Hathcock |
| 2005/0066631 | A1 | | 3/2005 | MacGuinness |
| 2005/0126134 | A1 | | 6/2005 | Hathcock |
| 2005/0284418 | A1 | | 12/2005 | Benefiel |

FOREIGN PATENT DOCUMENTS

GB         2 223 390 A    *    4/1990

OTHER PUBLICATIONS

Horse Blankets by ReCover Blankets—ReCover Therapeutic Horse Blankets, http://recoverblankets.com, ReCover Blankets, Cardiff-by-the-Sea, CA.

* cited by examiner

*Primary Examiner*—Rob Swiatek
(74) *Attorney, Agent, or Firm*—Barry K Smith (57) ABSTRACT

A strapless horse blanket (10) made of stretch material has an exterior side (17), an interior side (19), a back portion (11), side portions (14), and a perimeter. The side portions (14) couple together at a front chest area (18), forming a neck opening (33) that has a firm material (24) or substantially inelastic material (31) attached around the circumference. The side portions (14) have front leg sleeve wraps (50) and rear leg sleeve wraps (52) that couple around each leg. The perimeter of the blanket, with the exception of the neck opening (33) has an elastic band (42) hidden in the blanket material. The back portion (11) has a back reinforcement strip (12) that extends from a neck area (16) to a tail end (60). High stress areas of the blanket at the sleeve wraps (50; 52) are supported by reinforcements (40). An embodiment with an optional strip of material with loop fastener (13) down the back portion (11) along with optional straps (15) facilitates attachment of a special over-blanket or sheet. The combination of the stretch material, coupled material at the chest and legs, material around the neck opening (33), elastic band, back reinforcing strip (12), and reinforcements (40) allow the blanket to fit comfortably and safely on a horse (20) and allow the horse to move freely without compromising the integrity of the blanket's original shape.

12 Claims, 9 Drawing Sheets

BODY BLANKET FOR HOOFED AND DOMESTICATED ANIMALS

CROSS-REFERENCE TO RELATED APPLICATIONS

Not applicable

FEDERALLY SPONSORED RESEARCH

Not applicable

SEQUENCE LISTING OR PROGRAM

Not applicable

BACKGROUND OF THE INVENTION

1. Field of the Invention

This invention relates to blankets for animals, specifically an improved and safer body blanket for covering and protecting hoofed and domesticated animals such as horses and dogs.

2. Prior Art

A typical, wearable blanket for use on an animal such as a horse is intended to provide protection from harsh weather and other environmental conditions and keep the animal's body dry and warm. It is also desirable to have a blanket that is as comfortable and safe as possible for the animal.

Previously, blankets such as horse blankets, stable blankets, turnout blankets, or turnout rugs were designed for the primary purpose of protecting the animal from harsh weather and made to fit to the horse's body by covering the animal from the neck to the tail and draping along the sides. The blanket would be held in place using a series of straps in locations such as across the front/chest of the horse just below the neck, across the belly area between the front and rear legs, and possibly under the tail. U.S. Pat. No. 1,028,138 to Schleicher (1912) represents a typical early variation of this type of blanket.

Thereafter, inventors made improvements with the primary purposes of improving fit and comfort and decreasing rubbing, chafing, and friction-related injuries. U.S. Pat. No. 6,877,300 to Hathcock (2005) discloses a horse blanket with a combination of hook and loop fasteners, strap and fasteners, and elasticized neck circumference at the chest and neck of the animal, elasticized gussets in the front leg area, elastic straps around the rear legs, and elastic straps across the belly. U.S. Pat. No. 6,467,244 to Kelley et al. (2002) shows a combination of closure flap assembly across the chest and elastic straps, clips, and securements around the neck. Other U.S. patents and patent applications have described blankets with cutouts over the legs combined with straps and surcingles across the belly and blankets with a modular covering system utilizing a complex system of different fabrics, anti-rub devices, hooks and loops, tabs, snap connectors, straps, and draw strings.

While the previous blankets incorporate features to improve the fit and comfort for the animal with the primary purpose being to cover and protect the animal from harsh weather, none of them focus on the safety of the animal and many of them suffer from a number of disadvantages:

(a) Their means of attachment to the horse can result in injury to the animal. For example, blankets using straps across the belly can lead to the horse getting his or her legs caught in the straps resulting in death or very dire injuries. Furthermore, if straps used to secure the blanket at the horse's chest, belly, legs, or tail were to open, come loose, or brush up against an object in the field or stall, the blanket could snag, get caught, or change position which could move the blanket into an uncomfortable and unsafe position and even terrorize the animal into doing itself grave harm or worse. For these reasons, it is often recommended that straps, especially elastic straps, be replaced yearly.

(b) The use of elastic bands, straps, and gussets to give the horse better movement and comfort results in the same snagging and safety issues as for straps. Also, the use of these components increases the possibility of having hanging straps and other components in a location where the horse can bite or chew on them.

(c) The combination of several different means of attachment (i.e., adjustable straps and hook and loop fasteners) or complex attachment systems increases the difficulty and time required in taking the blanket on and off of the horse.

(d) The use of a blanket material that is unable to stretch or give with the horse's movements can cause discomfort and misalignment of the blanket despite having features with elastic properties such as an elasticized circumference around the neck opening and use of gussets.

(e) Straps in locations such as across the belly and the use of gussets can result in chafing or friction-related injuries by drawing the blanket material taut at the horse's legs, causing blanket material to gather around the upper regions of the legs, or resulting in the blanket becoming trapped between the horse's inner legs and its body when the horse moves.

(f) The use of elastic material around the circumference of the neck opening may allow free movement and improve the ability of the horse to lower it's head to the ground; however, if the material is stretched too much or loses some of its elastic properties, the blanket may slip down to contact the points of the horse's shoulders. When the blanket slips down to the contact points of the horse's shoulders, it is no longer in a stable, relatively motionless position and instead the movement of the horse's shoulders can cause friction-related injury such as the hair being rubbed off around the neck or at the horse's withers.

(g) Elastic material around the circumference of the neck opening may be stretched too much or lose some of its elastic properties, causing the blanket to be pulled towards the horse's hindquarters. This misalignment of the blanket will make it unattractive on the horse.

(h) The lack of a means to attach an optional over-blanket or sheet prevents the use of an over-blanket made of highly durable material to provide extra protection to the blanket from damage from hazards such as barbed wire or rough play with and biting by other horses.

3. Objects and Advantages

Accordingly, several objects and advantages of the present invention are:

(a) to provide an animal blanket that is safer through the use of mutually attachable connecting material rather than straps to fit and secure the blanket to the animal at its chest and around the upper part of its legs;

(b) to provide an animal blanket that is more actively wearable and comfortable through the use of a combination of stretch material and mutually attachable connecting material;

(c) to provide an animal blanket that may be easily and quickly placed on and removed from the animal through the use of stretch material and mutually attachable connecting material;

(d) to provide an animal blanket that is able to stretch and give with the animal's movements while minimizing shifting or misalignment and ensuring a stable and close fit on the animal through the use of a combination of stretch material and mutually attachable connecting material;

(e) to provide an animal blanket that minimizes the possibility of friction-related injury by minimizing shifting or misalignment and ensuring a stable and close fit on the animal through the use of a combination of stretch material and mutually attachable connecting material at the upper regions of the animal's legs;

(f) to provide an animal blanket that minimizes the possibility of friction-related injury around the neck area by keeping the neck opening above the animal's shoulders through the use of a combination of stretch material, a firm or substantially inelastic material for substantially the entire circumference of the neck area, and mutually attachable connecting material;

(g) to provide an animal blanket that minimizes the possibility of the blanket being pulled to an unattractive position toward the animal's hindquarters by keeping the neck opening above the animal's shoulders through the use of a combination of stretch material, mutually attachable connecting material, and a firm or substantially inelastic material for substantially the entire circumference of the neck area; and (h) to provide an animal blanket that will allow easy and quick attachment of an over-blanket or sheet through the use of a strip of mutually attachable connecting material along the animal's back between the head and tail end of the blanket that will couple to corresponding mutually attachable connecting material on the over-blanket and straps attached to the blanket at the shoulder area that will loop through one or more grommets on the over-blanket and join up with the same strap by using mutually attachable connecting material on the strap.

Another object and advantage is to provide an animal blanket that prevents the stretching of the blanket out of shape over time through the use of a narrow elastic band along the outside edges of the blanket to help maintain the integrity of the blanket's original shape. Still another object and advantage is to eliminate the need for a belly strap through the use of a narrow elastic band along the outside edges of the blanket to keep the blanket taut along the sides of the animal. Still another object and advantage is to provide an animal blanket that limits the stretch of the material in pressure points or high-stress areas through the use of rigid or semi-rigid reinforcements attached at the pressure points or high-stress areas. Still another object and advantage is to provide an animal blanket that limits the stretch along the portion of the blanket that sits on the back of the animal through the use of a strip of firm or substantially inelastic material along the animal's back between the head end and tail end of the blanket, thus helping to maintain the blanket's original length. Still further objects and advantages will become apparent from a consideration of the ensuing description and drawings.

SUMMARY

In accordance with the invention, an animal blanket comprises a stretch material in combination with mutually attachable connecting material attached to the stretch material to secure the blanket to the animal at the chest and upper leg areas. Furthermore, the animal blanket comprises a firm or substantially inelastic material for substantially the entire circumference of the neck area, a narrow elastic band along the outside edges of the blanket, rigid or semi-rigid reinforcements attached at pressure points and high-stress areas, a strip of firm or substantially inelastic material between the head end and tail end, and the optional combination of a strip of mutually attachable connecting material attached between the head end and tail end and straps with mutually attachable connecting material attached to the shoulder area.

DRAWINGS

Figures

DRAWINGS

Reference Numerals 10A animal blanket embodiment #1
10B animal blanket embodiment #2
10C animal blanket embodiment #3
11 back portion
12 back reinforcing strip
13 back strip with loop fastener
14 side portion
15 over-blanket attachment strap
16 neck area
17 exterior side
18 chest area
19 interior side
20 horse
22 neck
24 strip of fabric
30 edge portion of neck 31 exterior webbing around neck
32 right side neck closure
33 neck opening
34 left side neck closure
35 front closure flap
36 loop fastener for neck closure
38 hook fastener for neck closure
40 reinforcement
42 elastic band
50 front leg sleeve wrap
52 rear leg sleeve wrap
56 loop fastener for leg sleeve
57 front end of leg wrap
58 hook fastener for leg sleeve
59 rear end of leg wrap 60 tail end 62 tail end slack take-up stitch

DETAILED DESCRIPTION

Figure 1:
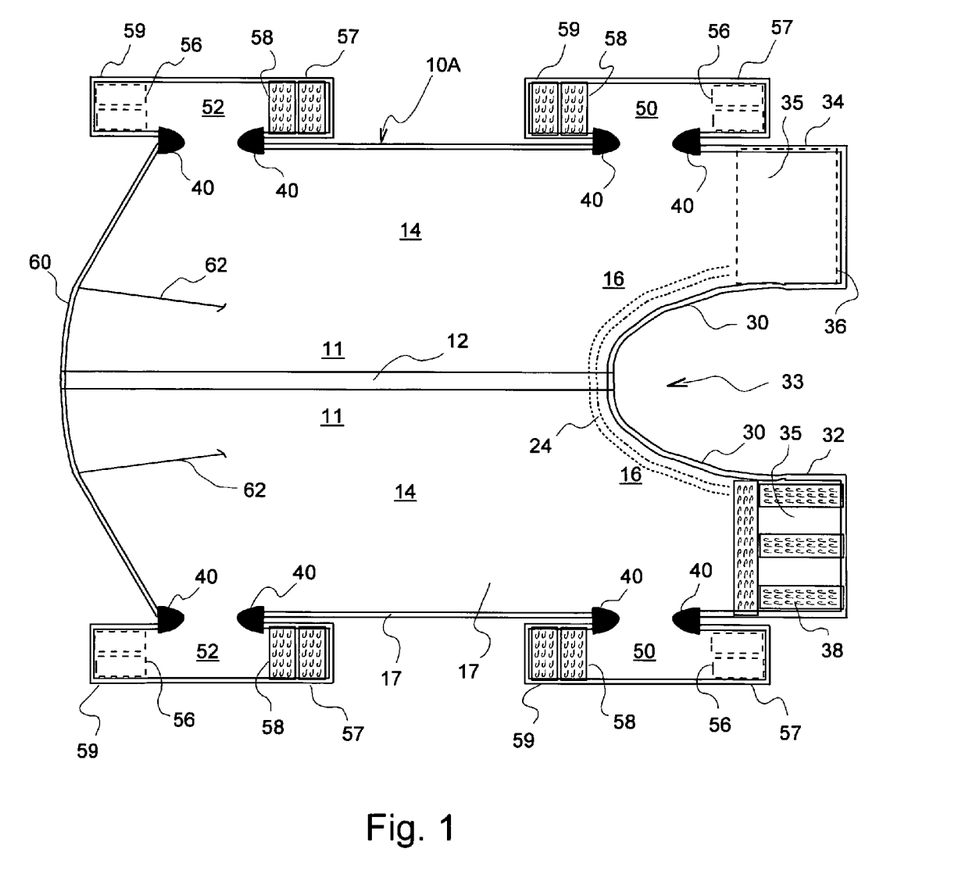
FIG. 1 is a plan view of an animal blanket in accordance with a preferred embodiment.
Figure 2:
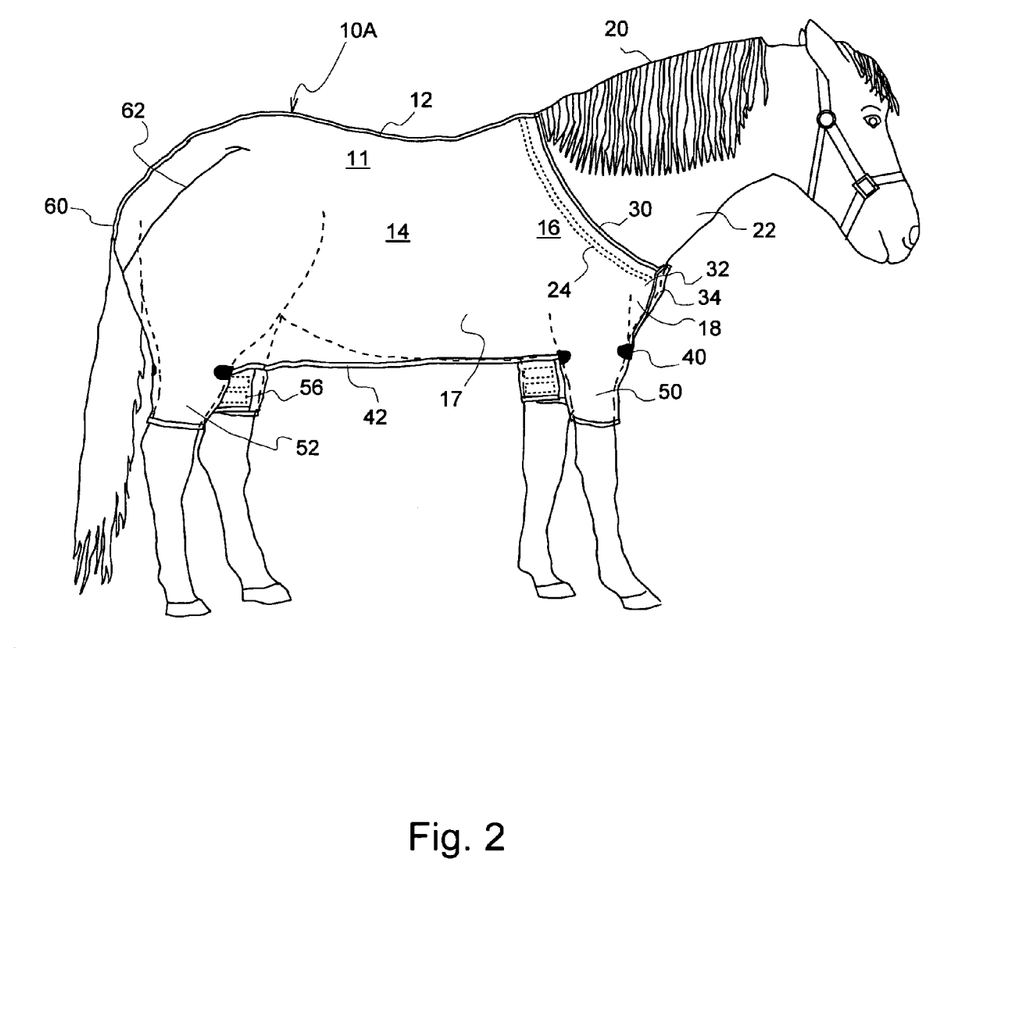
FIG. 2 is a side view of the blanket of FIG. 1, shown on a horse.
Figure 3:
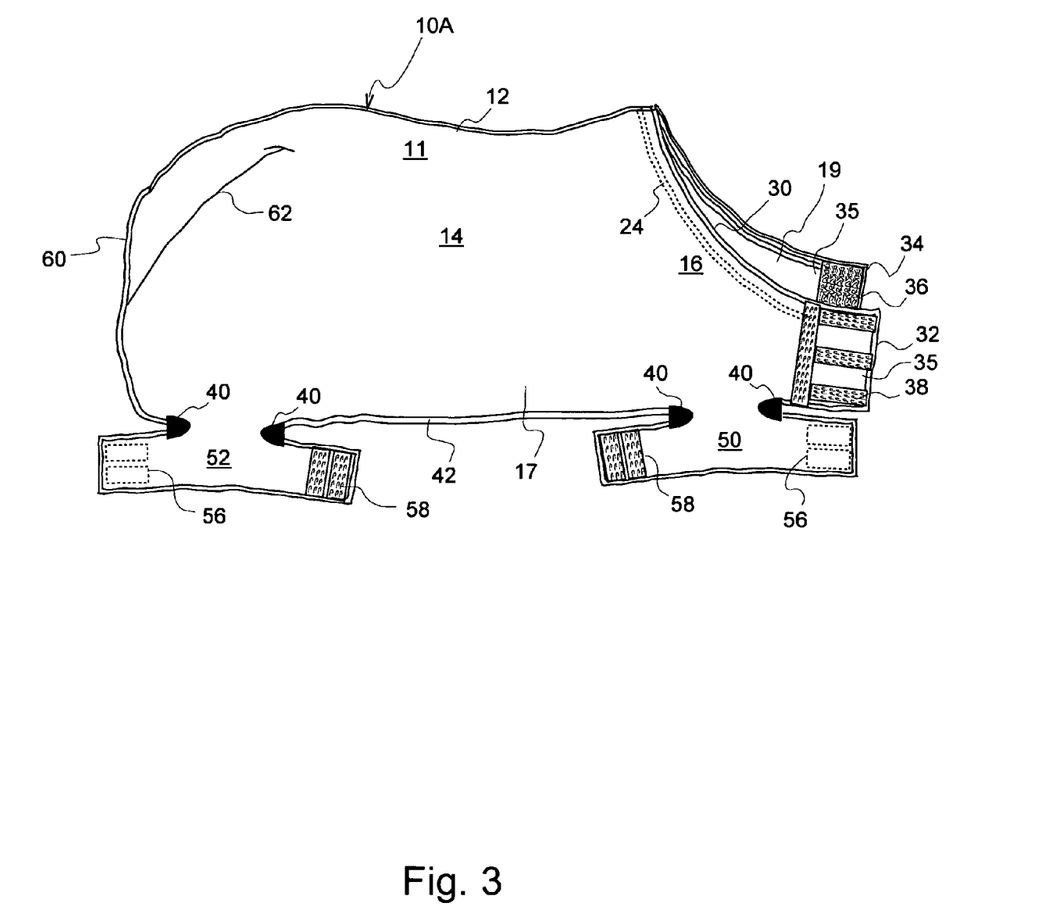
FIG. 3 is a side view of the blanket of FIG. 2 removed from the animal.

Preferred Embodiment—FIGS. 1, 2, 3

A preferred embodiment of the animal blanket of the present invention is illustrated in FIG. 1 (plan view), FIG. 2 (side view while on a horse), and FIG. 3 (side view). The animal blanket 10A is a body blanket suitable for use on a horse.

The blanket 10A can be made out of a variety of soft stretch materials, i.e., a fabric designed to contribute a desired amount of elasticity to the blanket while reducing friction. For example, in the preferred embodiment, the blanket 10A is made of a nylon, spandex, velour combination to ensure 4-way stretch, wind resistance, warmth, without bulk, a water repellant surface, breathability, durability, and the ability to machine wash. In addition to the previously listed characteristics, this fabric is the preferred material for the blanket because of desirable characteristics such as allowing horses to dry quickly after bathing, cooling them after workouts approximately twice as fast as competing blankets, and the ability to be used as a three season blanket as opposed to only being useful during one or two seasons of the year. However, material such as fleece, nylon, spandex, velour or a combination thereof may be used to suit any desired stretch, elasticity, or weight of the blanket and to meet certain weather, temperature, or other environmental conditions. There will be a single layer of material suitable for climate and conditions in which the horse is to be stabled. An additional layer or piece of material may be added to provide additional warmth to the animal either to the entire blanket or at specific locations (such as at the exterior of the front closure flap 35).

The blanket 10A has an exterior side 17, an interior side 19, and a back portion 11 that extends between a neck area 16 and a tail end 60 of the blanket. Side portions 14 extend from the back portion 11. When the blanket is on a horse 20, the back portion 11 extends along the back of the horse, while the side portions 14 depend down along the sides of the horse. The side portions 14 extend from the neck area 16 and the chest area 18 back to the tail end 60 of the horse. The side portions 14 have front closure flaps 35, front leg sleeve wraps 50, and rear leg sleeve wraps 52. The outer edges of the blanket 10 as shown in FIG. 1, with the exception of the edge of the neck portion 30, are elasticized using a narrow elastic band 42 hidden under the fabric.

The neck portion 30 of the blanket 10A has grosgrain, or other firm, closely woven fabric 24, hidden under the blanket material around substantially the entire circumference of the neck opening 33.

The front closure flaps 35 are designed to overlap, completing the blanket 10 coverage of the neck area 16 and the chest area 18 at the desired location around the horse's neck 22. The two front closure flaps 35 are comprised of a right side neck closure 32 and a left side neck closure 34. The flaps 35 have hook fasteners 38 and loop fasteners 36. Loop fasteners 36 are attached to the inside of the right side neck closure 32. Hook fasteners 38 are attached to the outside of the left side neck closure 34.

The blanket is fitted with front leg sleeve wraps 50. The front leg sleeve wraps 50 have loop fasteners 56 attached to the inside of the blanket material at the front end of the wrap 57 and hook fasteners 58 attached to the outside of the blanket material at the rear end of the wrap 59.

Additionally, the blanket is fitted with rear leg sleeve wraps 52. The rear leg sleeve wraps 52 have loop fasteners 56 attached to the inside of the blanket material at the front end of the wrap 57 and hook fasteners 58 attached to the outside of the blanket material at the rear end of the wrap 59.

Heavy vinyl reinforcements 40 are attached to the blanket side portions 14 at the locations where the front leg wraps 50 and rear leg wraps 52 are attached from the side portions 14.

A back reinforcing strip 12 made of waterproof webbing or other substantially inelastic or firm material is attached to the back portion of the blanket, extending from the neck area 16 to the tail end 60.

The tail end 60 of the blanket 10A has a tail end slack take-up stitch 62 on each side portion 14 extending a short distance from the tail end 60 toward the rear leg nearly parallel to the back reinforcing strip 12.

Operation

FIGS. 1, 2, 3

The blanket 10A is sized to fit on a horse by measuring from the center of the chest 18 to the side of the tail. The appropriately sized blanket 10 is put onto the back and sides of the horse.

The two front closure flaps 35 couple together with hook fasteners 38 and loop fasteners 36. When the front closure flaps 35 overlap to cause the loop fasteners 36 to contact the hook fasteners 38, the flaps 35 will be retained in place to attach the blanket to the chest area 18 and form the neck opening 33 at the desired location on the horse's neck 22.

The coupled front closure flaps 35 form a neck opening 33 defined by the edge of the neck portion 30 of the neck area 16 and chest area 18 of the blanket 10A.

The front leg sleeve wraps 50 are designed to wrap around the horse's front legs. The front end of the wrap 57 and the rear end of the wrap 59 will overlap to cause the loop fasteners 56 to contact the hook fasteners 58. The overlap of the wrap ends and coupling of the hook and loop fasteners will cause the front leg sleeve wraps 50 to attach to the front legs of the horse 20 in the form of sleeves.

The rear leg sleeve wraps 52 are designed to wrap around the horse's rear legs. The front end of the wrap 57 and the rear end of the wrap 59 will overlap to cause the loop fasteners 56 to contact the hook fasteners 58. The overlap of the wrap ends and coupling of the hook and loop fasteners will cause the rear leg sleeve wraps 52 to attach to the rear legs of the horse 20 in the form of pants-type legs.

The blanket's shape, size, and integrity are maintained through the addition of several features. First, the narrow elastic band 42 hidden under the blanket along the outside edges as shown in FIG. 1, with the exception of the edge of the neck portion 30, helps to maintain the integrity of the blanket's original shape and keeps the material taut along the side portions 14 and tail end 60, thus eliminating the need for straps or other fasteners to connect the side portions 14 under the horse 20. Next, a strip of grosgrain 24 hidden under the blanket around substantially the entire circumference of the neck opening 33 helps to keep the neck opening 33 above the horse's shoulders, thus minimizing the possibility of friction-related injury around the neck area 16. Furthermore, the reinforcements 40 limit the stretch of the blanket material in high-stress areas where the front leg sleeve wraps 50 and rear leg sleeve wraps 52 extend from the side portions 14 of the blanket. The reinforcements 40 also hold the narrow elastic band 42 in place. Additionally, the back reinforcing strip 12 limits the stretch of the blanket along the back portion 11 of the blanket that sits on the back of the animal. Finally, the tail end slack take-up stitch 62 tapers or brings in excess material to ensure a snug fit at the tail end 60 of the horse.

The flexibility and softness of the blanket material along with the shape-supporting features and specific mode of application reduce the possibility of both undesirable movement, shifting, or misalignment of the blanket and friction-related injury due to rubbing or chafing at contact points. Furthermore, the flexible material allows the horse to move in a normal, natural manner. Additionally, the absence of any straps as a part of the blanket eliminates the possibility of strap-related injuries.

Additional Embodiment

Figure 4:
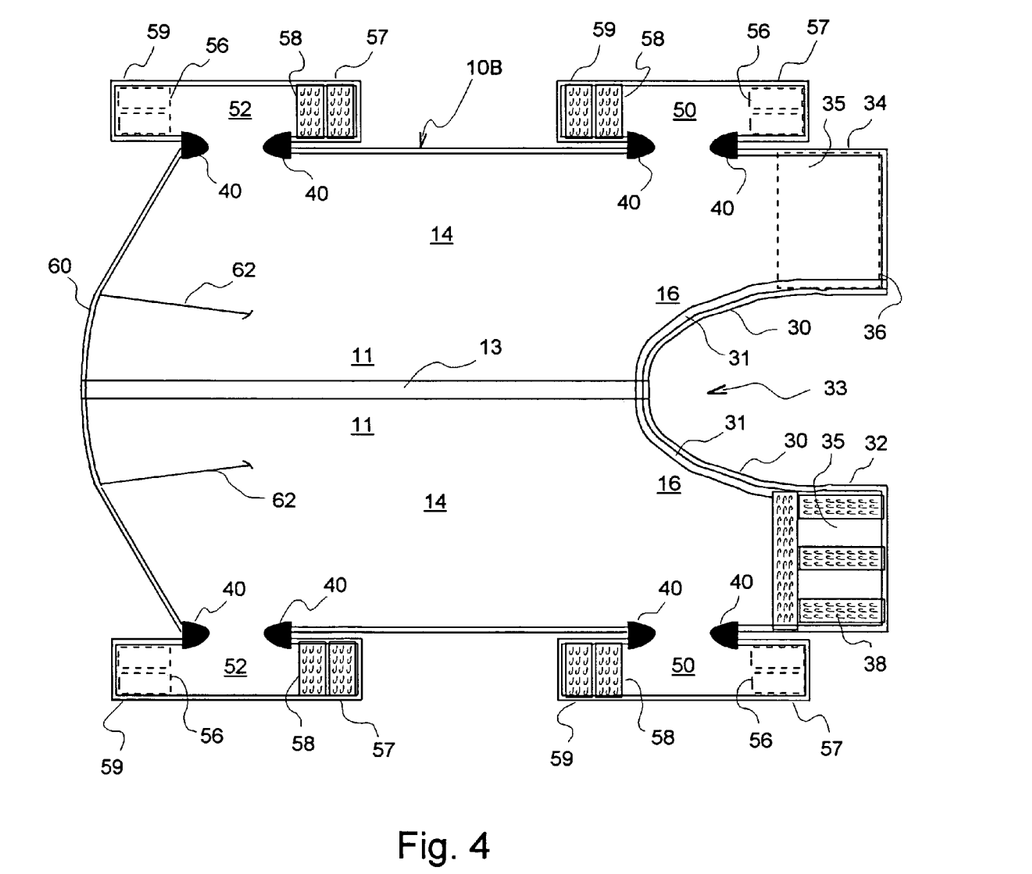
FIG. 4 is a plan view of an animal blanket in accordance with another embodiment.
Figure 5:
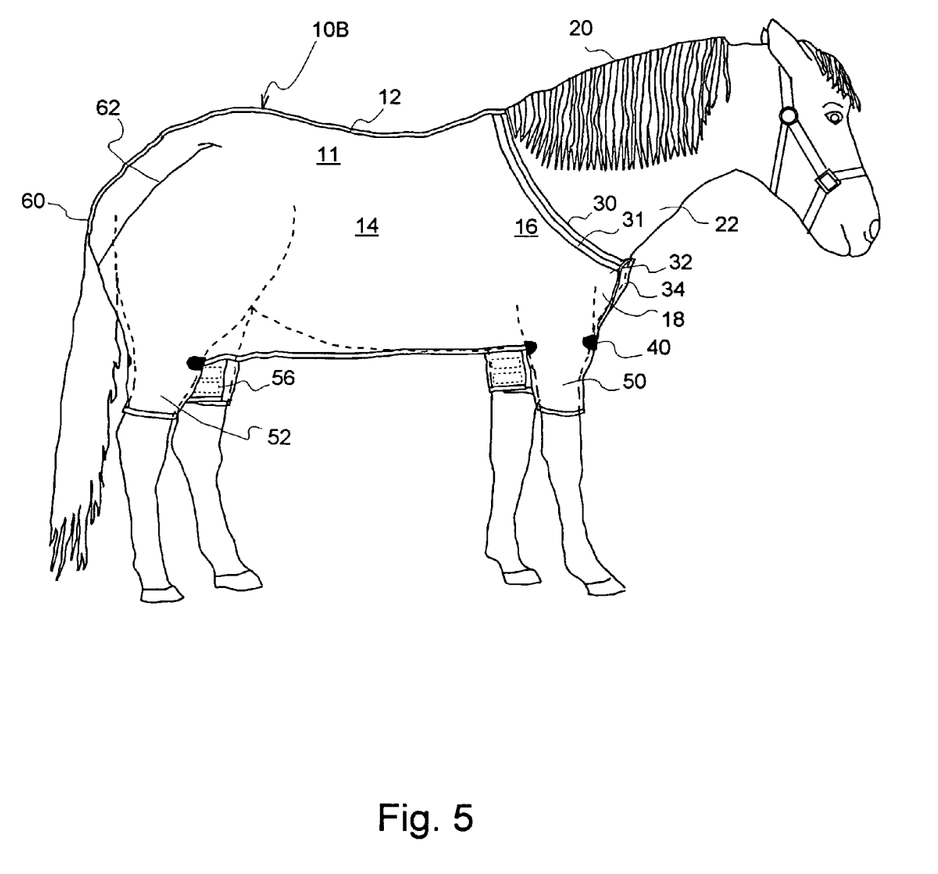
FIG. 5 is a side view of the blanket of FIG. 4, shown on a horse.
Figure 6:
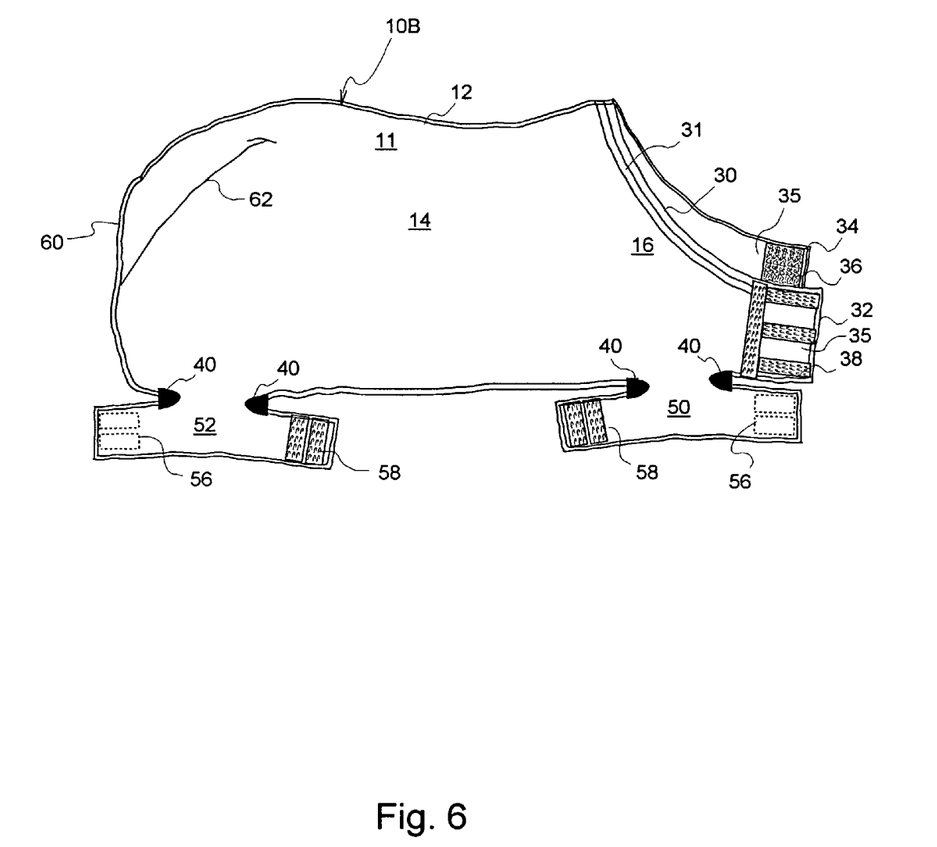
FIG. 6 is a side view of the blanket of FIG. 5 removed from the animal.

FIGS. 4, 5, 6

FIG. 4, FIG. 5, and FIG. 6 illustrate another embodiment of the blanket 10B. The neck portion 30 of this blanket 10B has a strip of nylon waterproof webbing 31, or other substantially inelastic material, attached to the outside of the blanket material around substantially the entire circumference of the neck opening 33. The waterproof webbing 31 helps to keep the neck opening 33 above the horse's shoulders, thus minimizing the possibility of friction-related injury around the neck area 16.

Additional Embodiment

Figure 7:
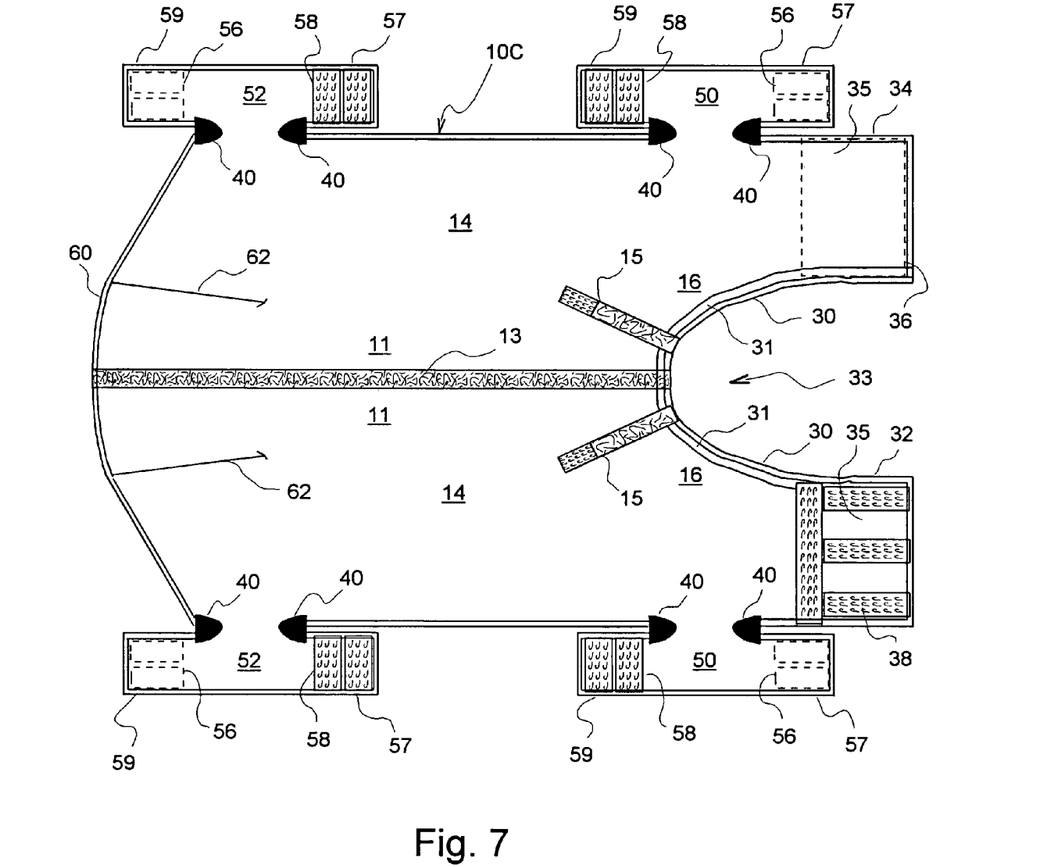
FIG. 7 is a plan view of an animal blanket in accordance with another embodiment.
Figure 8:
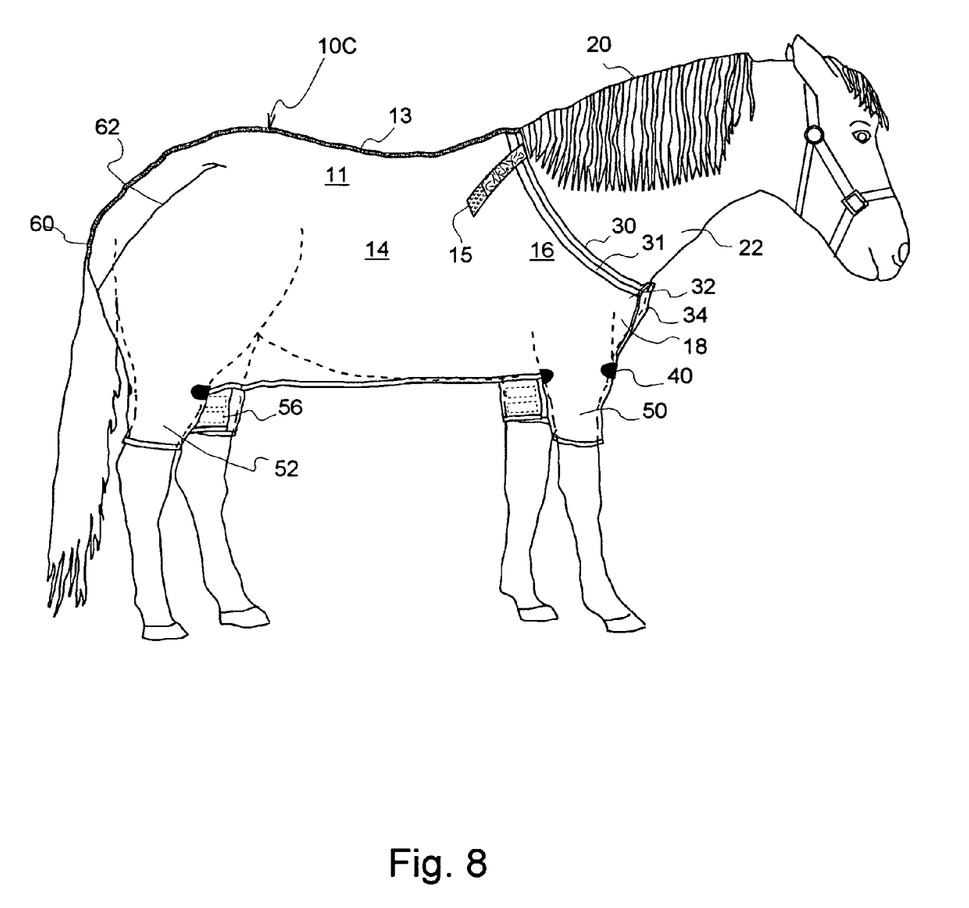
FIG. 8 is a side view of the blanket of FIG. 7, shown on a horse.
Figure 9:
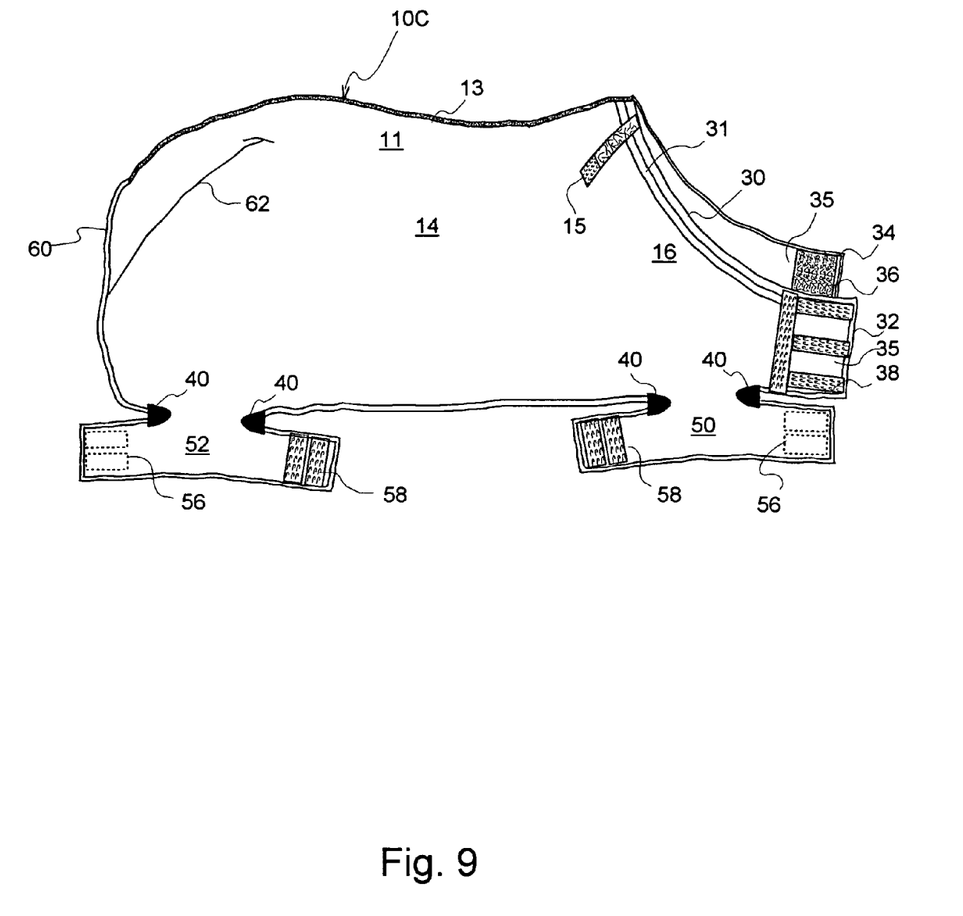
FIG. 9 is a side view of the blanket of FIG. 8 removed from the animal.

FIGS. 7, 8, 9

FIG. 7, FIG. 8, and FIG. 9 illustrate another embodiment of the blanket 10C. A strip of mutually attachable connecting material 13 is attached to the back portion 11 of the blanket, extending from the neck area 16 to the tail end 60. Two straps with mutually attachable connecting material 15 are attached at the edge portion of the neck 30 near the strip 13. The combination of the strip 13 and straps 15 facilitate attachment of an optional over-blanket having a corresponding strip of mutually attachable connecting material and grommets respectively.

Advantages

From the description above, a number of advantages of the animal blanket become evident:

(a) The use of mutually attachable connecting material, rather than straps, to fit and secure the blanket to the animal results in a blanket that is safer and eliminates the possibility of strap-related injuries.

(b) The blanket made by the combination of stretch material and mutually attachable connecting material will be actively wearable and comfortable for the animal.

(c) The use of stretch material and mutually attachable connecting material will allow the blanket to be easily and quickly placed on and removed from the animal.

(d) The presence of stretch material, mutually attachable material, and substantially inelastic material components will permit the blanket to stretch and give with the animal's movements while minimizing shifting or misalignment and ensuring a stable and close fit on the animal.

(e) The sleeves and pants-type leg wraps formed by wrapping the upper regions of the animal's legs with a combination of stretch material and mutually attachable connecting material will reduce the possibility of friction-related injury by minimizing shifting or misalignment of the blanket and ensuring a stable and close fit on the animal.

(f) With the use of a combination of stretch material, a firm or substantially inelastic material for substantially the entire circumference of the neck area, and mutually attachable connecting material, the neck opening of the blanket may be kept above the animal's shoulders, thus reducing the possibility of friction-related injury around the neck area.

(g) The use of a combination of stretch material for the blanket, mutually attachable connecting material to secure the blanket at the animal's chest, and a firm or substantially inelastic material for substantially the entire circumference of the neck area will minimize the possibility of the blanket being pulled to an unattractive position toward the animal's hindquarters by keeping the neck opening above the animal's shoulders.

(h) The presence of a narrow elastic band hidden in the blanket material along the outside edges of the blanket will help to maintain the integrity of the blanket's original shape by preventing the stretching of the blanket out of shape over time.

(i) The attachment of rigid or semi-rigid reinforcements at high-stress areas such as where the leg wraps extend from the sides of the blanket will limit stretch of the material in the high-stress areas.

(j) The presence of a strip of firm or substantially inelastic material attached to the blanket along the animal's back between the head end and tail end will limit the stretch along the portion of the blanket that sits on the animal's back and help to maintain the blanket's original length.

(k) The attachment of a strip of mutually attachable connecting material along the animals back between the head end and tail end and attachment at the neck of straps having mutually attachable connecting material will allow addition of an optional over-blanket or sheet having a corresponding strip of mutually attachable connecting material for securing to the strip on the blanket and grommets or D-rings for looping and connecting the straps.

CONCLUSION, RAMIFICATIONS, AND SCOPE

Accordingly, the reader will see that the animal blanket of this invention can be used to protect the animal from various temperature and other environmental conditions, protect the animal from both serious and minor injuries, and provide a comfortable fit. In addition, the blanket will be durable and able to maintain its integrity over time. Furthermore, the animal blanket has the additional advantages in that it provides increased safety with less maintenance by eliminating the use of straps;

it provides the animal with increased comfort and freedom of movement;

it provides a blanket that can be attached to and removed from the animal quickly and easily;

it permits the animal to move freely while minimizing shifting or misalignment and ensuring a close fit;

it provides a blanket that will be less likely to slide down the animal's neck and cause the edge of the neck portion to touch the animal's shoulders; and it provides a blanket that will be less likely to be pulled to an unattractive position toward the animal's hindquarters.

it provides a blanket that will allow attachment of an optional over-blanket or sheet While the above description contains many specificities, these should not be construed as limitations on the scope of the invention, but as exemplifications of the presently preferred embodiments thereof. Many other ramifications and variations are possible within the teachings of the invention without departing from the scope of the invention defined in the appended claims. For example, it is contemplated that the blanket described herein may be utilized on other animals, e.g., llamas, sheep, donkeys, goats, cats, dogs, hogs, etc. Additionally, different materials may be chosen for the blanket and attached material components to suit desired stretch, elastic, non-elastic, rigidity, or connecting ability requirements per the function of the different components and features. Furthermore, the blanket may be composed of a single piece of material or multiple pieces of material stitched together to facilitate cost efficient manufacture.

Thus the scope of the invention should be determined by the appended claims and their legal equivalents, and not by the examples given.

I claim:

1. In an animal blanket of the type comprising an exterior side, an interior side, a back portion having a neck area and a tail end, side portions depending from said back portion and extending from said tail end to said neck area and a chest area, and a neck opening located between said neck area of said back portion and said chest area, the improvement comprising:
 a body blanket material that is a soft stretchable material;
 front closure flaps extending from said chest area, said closure flaps comprising:
  a first closure flap with hook fasteners attached to said blanket exterior side of said first flap, and
  a second closure flap with loop fasteners attached to said blanket interior side of said second flap,
  whereby said closure flaps couple together at said chest area;
 a plurality of leg wraps extending from said side portions, said leg wraps comprising:
  a first end with hook fasteners attached to said blanket exterior side of said first end, and
  a second end with loop fasteners attached to said blanket interior side of said second end,
  whereby said first and second ends wrap around and couple together at the legs of the animal;
 a plurality of reinforcements attached to the blanket material where said leg wraps extend from said side portions;
 a narrow elastic band hidden under the blanket material and running along the outer edges of said blanket at said tail end and at said side portions between said leg wraps;
 a strip of substantially inelastic material around substantially the entire circumference of said neck opening and hidden under said blanket material; and
 a plurality of stitches extending from said tail end toward said side portions;
 whereby said blanket may be safely and quickly attached to the animal without the use of any straps.

2. The blanket of claim 1, further including a strip of material along said back portion and extending from said neck area to said tail end.

3. The blanket of claim 2, wherein said strip of material is mutually attachable connecting material and further including a plurality of straps with one end of each strap attached to said blanket at said neck area, said straps having mutually attachable connecting material, whereby said strip and said straps facilitate attachment of another blanket on top of said blanket.

4. The blanket of claim 1, wherein said reinforcements hold said elastic bands in place.

5. An animal blanket of the type comprising an exterior side, an interior side, a back portion having a neck area and a tail end, side portions depending from said back portion and extending from said tail end to said neck area and a chest area, and a neck opening located between said neck area of said back portion and said chest area, characterized in that said blanket is of a type further comprising:
 (a) material that is soft and stretchable;
 (b) front closure flaps extending from said chest area, wherein said closure flaps have a left side closure and a right side closure, whereby said left side and said right side closures couple together by way of hook and loop fasteners at said chest area;
 (c) a plurality of leg wraps extending from said side portions, wherein said leg wraps have a front end and a rear end, whereby said front and rear ends wrap around and couple together by way of hook and loop fasteners at the legs of the animal;
 (d) a plurality of reinforcements attached to the blanket material where said leg wraps extend from said side portions;
 (e) a narrow elastic band running along the outer edges of said blanket;
 (f) a strip of substantially inelastic material around substantially the entire circumference of said neck opening and attached to the blanket material;
 (g) a plurality of stitches extending from said tail end toward said side portions whereby excess material may be drawn in to facilitate fitting of said blanket at said tail end; and
 (h) a strip of material along said back portion and extending from said neck area to said tail end.

6. The blanket of claim 5, wherein said strip of substantially inelastic material is hidden under said blanket material.

7. The blanket of claim 5, wherein said elastic band is hidden under said blanket material.

8. The blanket of claim 5, wherein said elastic band stops at said neck area.

9. The blanket of claim 5, wherein said elastic band is at said tail end.

10. The blanket of claim 5, wherein said elastic band extends along said side portions between said leg wraps.

11. The blanket of claim 5 wherein said strip of material is mutually attachable connecting material and further including a plurality of straps with one end of each strap attached to said blanket at said neck area, said straps having mutually attachable connecting material, whereby said strip and said straps facilitate attachment of another blanket on top of said blanket.

12. A method of attaching an animal blanket to an animal, the blanket comprising an exterior side, an interior side, a back portion having a neck area and a tail end, side portions depending from said back portion and extending from said tail end to said neck area and a chest area, a neck opening located between said neck area of said back portion and said chest area, material that is soft and stretchable, front closure flaps with hook and loop fasteners extending from said chest area, a plurality of leg wraps with hook and loop fasteners extending from said side portions, reinforcements attached to said blanket where said leg wraps extend from said side portions, a narrow elastic band hidden under the blanket material and running along the outer edges of said blanket, a strip of mutually attachable connecting material along said back portion and extending from said neck area to said tail end, and a plurality of straps with one end of each strap attached to said blanket at said neck area, said straps having mutually attachable connecting material, the method comprising the steps of:
 (a) placing the blanket on an animal with said strip of material along said back portion corresponding to the center of the back of said animal with said neck area at the front of said animal and said tail end at the rear of said animal;
(b) overlapping the left closure and the right closure of said front closure flaps and coupling said front closure flaps by way of said hook and loop fasteners;
(c) wrapping said plurality of leg wraps around each leg, overlapping the front end and the rear end of said leg wraps, and coupling said front end and said rear end of each of said leg wraps by way of said hook and loop fasteners;

(d) ensuring said strip of material is approximately flat and straight; and
(e) pulling said straps away from said blanket such that each of said straps can be looped and coupled to itself by way of mutually attachable connecting material;
whereby said animal blanket may be easily and safely attached to said animal; and
whereby said strip of material and said straps will facilitate attachment of another blanket on top of said blanket.

* * * * *